US010613815B2

(12) United States Patent
Ellis et al.

(10) Patent No.: US 10,613,815 B2
(45) Date of Patent: Apr. 7, 2020

(54) APPARATUS FOR POSITIONING AN INTERACTIVE-DISPLAY DEVICE WITHIN AN INTERIOR OF AN AUTONOMOUS VEHICLE

(71) Applicant: UATC, LLC, San Francisco, CA (US)

(72) Inventors: Johad Husseini Ellis, Pittsburgh, PA (US); Christopher Matthew D'Eramo, Bethel Park, PA (US)

(73) Assignee: UATC, LLC, San Francisco, CA (US)

( * ) Notice: Subject to any disclaimer, the term of this patent is extended or adjusted under 35 U.S.C. 154(b) by 17 days.

(21) Appl. No.: 16/010,757

(22) Filed: Jun. 18, 2018

(65) Prior Publication Data

US 2019/0361656 A1 Nov. 28, 2019

Related U.S. Application Data

(60) Provisional application No. 62/674,761, filed on May 22, 2018.

(51) Int. Cl.
*G06F 3/147* (2006.01)
*G09G 5/36* (2006.01)
(Continued)

(52) U.S. Cl.
CPC .............. *G06F 3/147* (2013.01); *B60K 35/00* (2013.01); *G06F 3/0488* (2013.01); *G09G 5/363* (2013.01); *B60K 2370/1438* (2019.05); *B60K 2370/52* (2019.05); *G09G 2354/00* (2013.01); *G09G 2380/10* (2013.01)

(58) Field of Classification Search
CPC ........ B60K 2370/52; B60K 2370/1438; B60K 2370/182; B60K 2370/175; B60K 28/066; G09G 2354/00; G09G 2380/10; B60N 2/01; B60N 2/3011; B60N 2/3065; B60N 2/874; B60N 2/206; B60N 2/2222; B60N 2/91; B60N 2/244; B60N 2/292; B60N 2/06; B60N 2/0745; B60N 2/062; B60N 2/14; B60N 3/06; B60R 7/04; B60R 2011/0007; B60W 50/08; B60W 50/14; B60W 40/08; B60W 30/182; B60W 2040/0809; B60W 2040/0827; B60W 2040/0836; B60W 2040/0872; B60W 2540/22; B60W 2540/24; B60W 2540/26; B60W 2540/28; B60W 2540/30; G05D 1/0061; G05D 2201/0213; G06K 9/00845
See application file for complete search history.

(56) References Cited

U.S. PATENT DOCUMENTS

4,026,379 A * 5/1977 Dunn ..................... B60N 2/143
180/331
9,233,645 B2 * 1/2016 Schofield ................ B60C 23/00
(Continued)

*Primary Examiner* — Christopher E Leiby
(74) *Attorney, Agent, or Firm* — Dority & Manning, PA (57) ABSTRACT

The present disclosure is directed to an apparatus for positioning an interactive-display device within an interior of an autonomous vehicle. In particular, an autonomous vehicle can include an interior comprising at least two different interior portions configured to accommodate one or more passengers. The autonomous vehicle can also include an interactive-display device. The autonomous vehicle can further include an apparatus for positioning the interactive-display device within the interior such that it is accessible by at least one of the passenger(s).

18 Claims, 6 Drawing Sheets

(51) Int. Cl.
  *G06F 3/0488* (2013.01)
  *B60K 35/00* (2006.01)

(56) References Cited

U.S. PATENT DOCUMENTS

| | | | |
|---|---|---|---|
| 9,494,940 B1 | 11/2016 | Kentley | |
| 9,783,202 B2 | 10/2017 | Yamada | |
| 9,855,860 B2* | 1/2018 | Ahn | B60N 2/01 |
| 2003/0234550 A1* | 12/2003 | Brooks | B60R 7/04 |
| | | | 296/24.46 |
| 2006/0164230 A1* | 7/2006 | DeWind | B60K 35/00 |
| | | | 340/461 |
| 2010/0264688 A1* | 10/2010 | Cheal | B60J 5/103 |
| | | | 296/146.4 |
| 2014/0025262 A1* | 1/2014 | Eggeling | B60J 5/103 |
| | | | 701/49 |
| 2014/0263511 A1* | 9/2014 | Clements | B60R 11/02 |
| | | | 224/483 |
| 2016/0152163 A1* | 6/2016 | Strasdat | B60R 7/04 |
| | | | 296/64 |
| 2016/0272141 A1* | 9/2016 | Ohmura | B60R 21/01554 |
| 2017/0050564 A1* | 2/2017 | Lv | B60K 35/00 |
| 2017/0267126 A1* | 9/2017 | Reuschel | B60N 2/074 |
| 2018/0222490 A1* | 8/2018 | Ishihara | B60W 50/14 |
| 2018/0244175 A1* | 8/2018 | Tan | B60N 2/0248 |
| 2019/0001841 A1* | 1/2019 | Vanel | B60N 3/001 |
| 2019/0070959 A1* | 3/2019 | Hamasaki | G06F 13/00 |
| 2019/0084421 A1* | 3/2019 | Hwang | B60K 37/06 |
| 2019/0092238 A1* | 3/2019 | Karner | B60R 1/06 |
| 2019/0189087 A1* | 6/2019 | Helot | B60K 35/00 |
| 2019/0196679 A1* | 6/2019 | You | G06F 3/04817 |
| 2019/0217754 A1* | 7/2019 | Fukawatase | B60N 2/3011 |
| 2019/0232786 A1* | 8/2019 | Sasaki | B60K 35/00 |

\* cited by examiner

APPARATUS FOR POSITIONING AN INTERACTIVE-DISPLAY DEVICE WITHIN AN INTERIOR OF AN AUTONOMOUS VEHICLE

PRIORITY CLAIM

This application claims priority to U.S. Patent Application Ser. No. 62/674,761, filed May 22, 2018, and entitled "APPARATUS FOR POSITIONING AN INTERACTIVE-DISPLAY DEVICE WITHIN AN INTERIOR OF AN AUTONOMOUS VEHICLE," the disclosure of which is incorporated by reference herein in its entirety.

FIELD

The present disclosure relates generally to autonomous vehicles. More particularly, the present disclosure relates to an apparatus for positioning an interactive-display device within an interior of an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

An example aspect of the present disclosure is directed to an autonomous vehicle that includes an interior comprising at least two different interior portions configured to accommodate one or more passengers. The autonomous vehicle can also include an interactive-display device. The autonomous vehicle can further include an apparatus for positioning the interactive-display device within the interior such that it is accessible by at least one of the passenger(s). The interactive-display device can be affixed to at least a portion of the apparatus. The apparatus can be affixed to at least a portion of the interior. The apparatus can be configured to position the interactive-display device in at least two different predetermined positions associated with the at least two different interior portions configured to accommodate the passenger(s).

Another example aspect of the present disclosure is directed to an apparatus for positioning an interactive-display device within an interior of an autonomous vehicle. The apparatus can include a portion for affixing an interactive-display device to at least a portion of the apparatus. The apparatus can also include a portion for affixing the apparatus to at least a portion of an interior of an autonomous vehicle. The interior can comprise at least two different interior portions configured to accommodate one or more passengers. The apparatus can further include a mechanism for moving the interactive-display device between at least two different predetermined positions associated with the at least two different interior portions configured to accommodate the passenger(s).

A further example aspect of the present disclosure is directed to a system including one or more processors and a memory storing instructions that when executed by the processor(s) cause the system to perform operations. The operations can include receiving data indicating a position of an interactive-display device within an interior of an autonomous vehicle. The data can indicate the interactive-display device is positioned in a particular position of at least two different predetermined positions of the interactive-display device within the interior associated with at least two different interior portions configured to accommodate one or more passengers of the autonomous vehicle. The particular position can be associated with a particular portion of the at least two different interior portions. The operations can also include generating, based at least in part on the data indicating the position, data describing one or more graphical interfaces for display by the interactive-display device. The graphical interface(s) can include one or more elements positioned within the graphical interface(s) to be accessible by a passenger located in the particular portion of the interior of the autonomous vehicle. The operations can further include communicating, to the interactive-display device, the data describing the graphical interface(s) for display by the interactive-display device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Example aspects of the present disclosure are directed to an apparatus for positioning an interactive-display device within an interior of an autonomous vehicle. In particular, an autonomous vehicle can include an interior comprising multiple different interior portions (e.g., seats, and/or the like) configured to accommodate one or more passengers. The interior of the autonomous vehicle can also include an interactive-display device (e.g., tablet computer, and/or the like). The interactive-display device can be affixed to at least a portion of an apparatus, at least a portion of which can be affixed to the interior. The apparatus can be configured to position the interactive-display device within the interior such that it is accessible by at least one of the passenger(s), for example, in multiple different predetermined positions associated with the different portions of the interior configured to accommodate the passenger(s).

In some embodiments, the different portions of the interior can include a portion configured such that a passenger occupying the portion faces forward within the interior and a portion configured such that a passenger occupying the portion faces rearward within the interior. In some of such embodiments, the different predetermined positions can include a position that locates the interactive-display device such that it is accessible by the passenger facing forward and a position that locates the interactive-display device such that it is accessible by the passenger facing rearward.

In some embodiments, the apparatus can include a track along which the interactive-display device is configured to travel amongst the different predetermined positions. For example, the track can include multiple different discrete positions that are distinct from one another and include the different predetermined positions. Additionally or alternatively, the track can provide continuous resistance to the travel by the interactive-display device amongst the different predetermined positions such that the interactive-display device can be positioned in a stationary manner between one or more of the different predetermined positions.

In some embodiments, a geometry of the track can define (e.g., via a perimeter of the shape of the track, and/or the like) at least in part a cavity in the at least a portion of the interior to which the apparatus is affixed. In some of such embodiments, the cavity can accommodate one or more wires and/or cables that interface the interactive-display device with the autonomous vehicle (e.g., to mitigate exposure of the wire(s) and/or cable(s) to the passenger(s), and/or the like).

In some embodiments, the apparatus can include a motor configured to move the interactive-display device amongst the different predetermined positions. For example, the autonomous vehicle can include one or more sensors (e.g., seat pressure sensors, interior cameras, and/or the like) configured to detect the presence of the passenger(s) in one or more of the different portions of the interior, and the apparatus can be configured to utilize the motor to move the interactive-display device to a position (e.g., of the different predetermined positions, and/or the like) associated with a portion of the interior in which the one or more sensors have detected presence of a passenger (e.g., in response to the sensor(s) detecting such presence, and/or the like). Additionally or alternatively, the apparatus can be configured to utilize the motor to move the interactive-display device to a default position (e.g., located between one or more of the different predetermined positions, and/or the like), for example, in response to a determination (e.g., based at least in part on data generated by the sensor(s), and/or the like) that the different portions of the interior are unoccupied by the passenger(s).

In some embodiments, the apparatus can be affixed to at least an interior portion of a door of the autonomous vehicle. In some embodiments, the door can include a portion that opens toward the top of the autonomous vehicle and a portion that opens toward the bottom of the autonomous vehicle (e.g., the door portions can open vertically away from one another, and/or the like). In some of such embodiments, the apparatus can be affixed to at least an interior portion of the door portion that opens toward the top of the autonomous vehicle.

In some embodiments, the autonomous vehicle can include a computing system configured to generate data describing one or more graphical interfaces for display by the interactive-display device and to communicate such data to the interactive-display device. In some embodiments, the apparatus can generate data indicating a position of the interactive-display device within the interior (e.g., a particular position of the predetermined positions, and/or the like), and the computing system can receive such data. In some of such embodiments, the computing system can generate the data describing the graphical interface(s) based at least in part on the data indicating the position of the interactive-display device. For example, the graphical interface(s) can include one or more elements positioned within the graphical interface(s) to be accessible by a passenger located in a portion of the interior associated with the position of the interactive-display device indicated by the data received from the apparatus.

In some embodiments, the interactive-display device can include a touchscreen. In some of such embodiments, the element(s) of the graphical interface(s) can correspond to one or more functions of the autonomous vehicle for invocation (e.g., via the touchscreen, and/or the like) by the passenger located in the portion of the interior associated with the position of the interactive-display device. For example, such function(s) can include one or more functions (e.g., one or more high-priority functions, safety-related functions, frequently accessed functions, and/or the like) for which accessibility by the passenger has been determined to be important (e.g., relative to one or more other functions of the autonomous vehicle, and/or the like).

In some embodiments, the interactive-display device can include one or more configurable controls. In some of such embodiments, the element(s) of the graphical interface(s) can include one or more labels for the configurable control(s). Such label(s) can identify one or more functions of the autonomous vehicle, and the computing system can configure the configurable control(s) to correspond to the function(s) of the autonomous vehicle. For example, the function(s) can include one or more functions for which accessibility by the passenger has been determined to be important, and the computing system can configure one or more of the configurable control(s) more readily accessible by the passenger located in the portion of the interior associated with the position of the interactive-display device to correspond to such important function(s).

The technology described herein can provide a number of technical effects and benefits. For example, the technology described herein can enable an interactive-display device to be positioned within an interior of an autonomous vehicle such that it is accessible by a passenger, configure the interactive-display device such that one or more functions of the autonomous vehicle are readily accessible to the passenger, and/or the like. It will be appreciated that the technology described herein can provide greater passenger accessibility to an interactive-display device (e.g., compared to accessibility of a single stationary interactive-display device, and/or the like). Moreover, the technology described herein can obviate a need for multiple (e.g., redundant, and/or the like) interactive-display devices, thereby preserving available interior space of the autonomous vehicle for other purposes (e.g., passenger comfort, and/or the like).

With reference now to the Figures, example embodiments of the present disclosure will be discussed in further detail.

Figure 1:
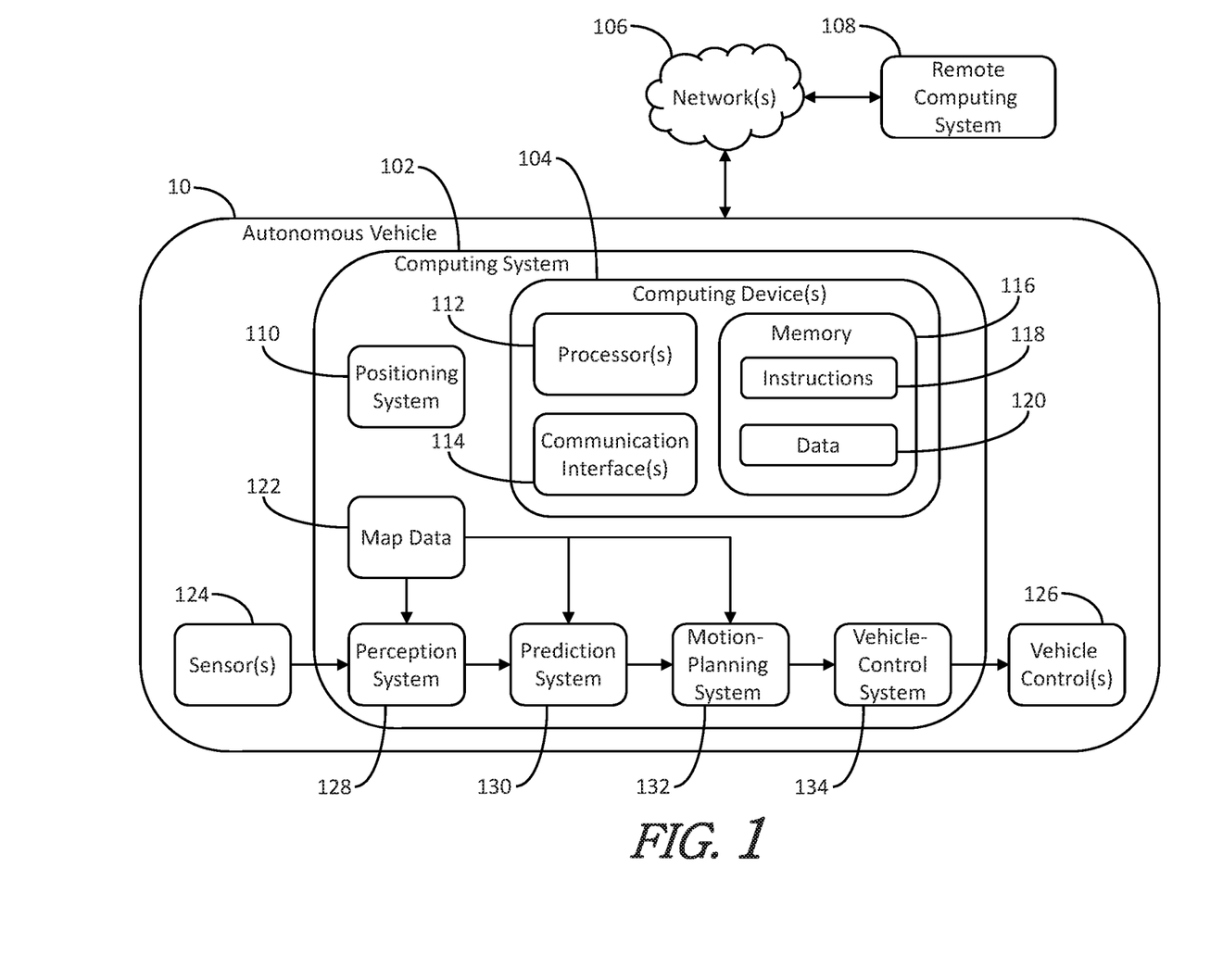
FIG. 1 depicts an example autonomous vehicle according to example embodiments of the present disclosure.

FIG. 1 depicts an example autonomous vehicle according to example embodiments of the present disclosure.

Referring to FIG. 1, autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10. One or more networks 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

Figure 2:
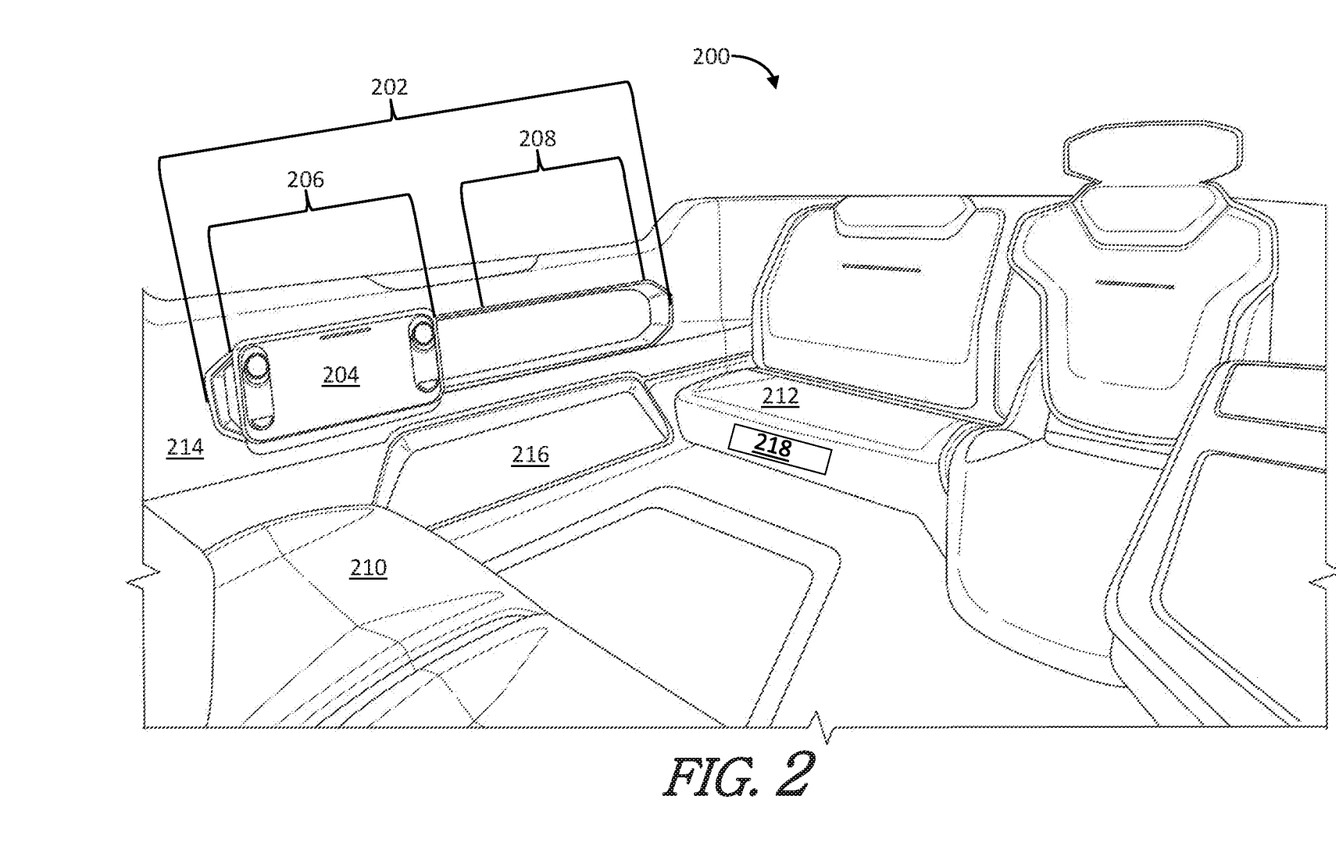
FIG. 2 depicts an example design of aspects of an interior of an autonomous vehicle according to example embodiments of the present disclosure.

FIG. 2 depicts an example design of aspects of an interior of an autonomous vehicle according to example embodiments of the present disclosure.

Referring to FIG. 2, autonomous vehicle 10 can include interior 200. Interior 200 can include multiple different interior portions (e.g., seats, and/or the like) configured to accommodate one or more passengers. For example, interior 200 can include portions 210 and 212. In some embodiments, portion 210 can be configured such that a passenger occupying portion 210 faces rearward within interior 200. Similarly, portion 212 can be configured such that a passenger occupying portion 212 faces forward within interior 200.

Interior 200 can also include interactive-display device 204 (e.g., a tablet computer, and/or the like) for utilization by one or more of such passenger(s).

In accordance with aspects of the disclosure, interior 200 can include apparatus 202 for positioning interactive-display device 204 within interior 200. Apparatus 202 can be configured to position interactive-display device 204 in multiple different predetermined positions associated with different portions of interior 200. For example, apparatus 202 can be configured to position interactive-display device 204 in position 206 associated with portion 210 (e.g., such that interactive-display device 204 is accessible by the passenger occupying portion 210, and/or the like) and/or in position 208 associated with portion 212 (e.g., such that interactive-display device 204 is accessible by the passenger occupying portion 212, and/or the like).

Interactive-display device 204 can be affixed to at least a portion of apparatus 202, at least a portion of which can be affixed to interior 200. In some embodiments, apparatus 202 can be affixed to at least an interior portion of a door of autonomous vehicle 10. In some embodiments, the door can include portion 214 that opens toward the top of autonomous vehicle 10 and portion 216 that opens toward the bottom of autonomous vehicle 10 (e.g., portions 214 and 216 can open vertically away from one another, and/or the like). In some of such embodiments, apparatus 202 can be affixed to at least an interior portion of portion 214.

In some embodiments, autonomous vehicle 10 can include one or more sensors (e.g., seat pressure sensors, interior cameras, and/or the like) configured to detect the presence of the passenger(s) in one or more of the different portions of interior 200. For example, autonomous vehicle 10 can include one or more sensors 218, which can be configured to detect the presence of one or more passengers in portion 212, and/or the like.

Figure 3:
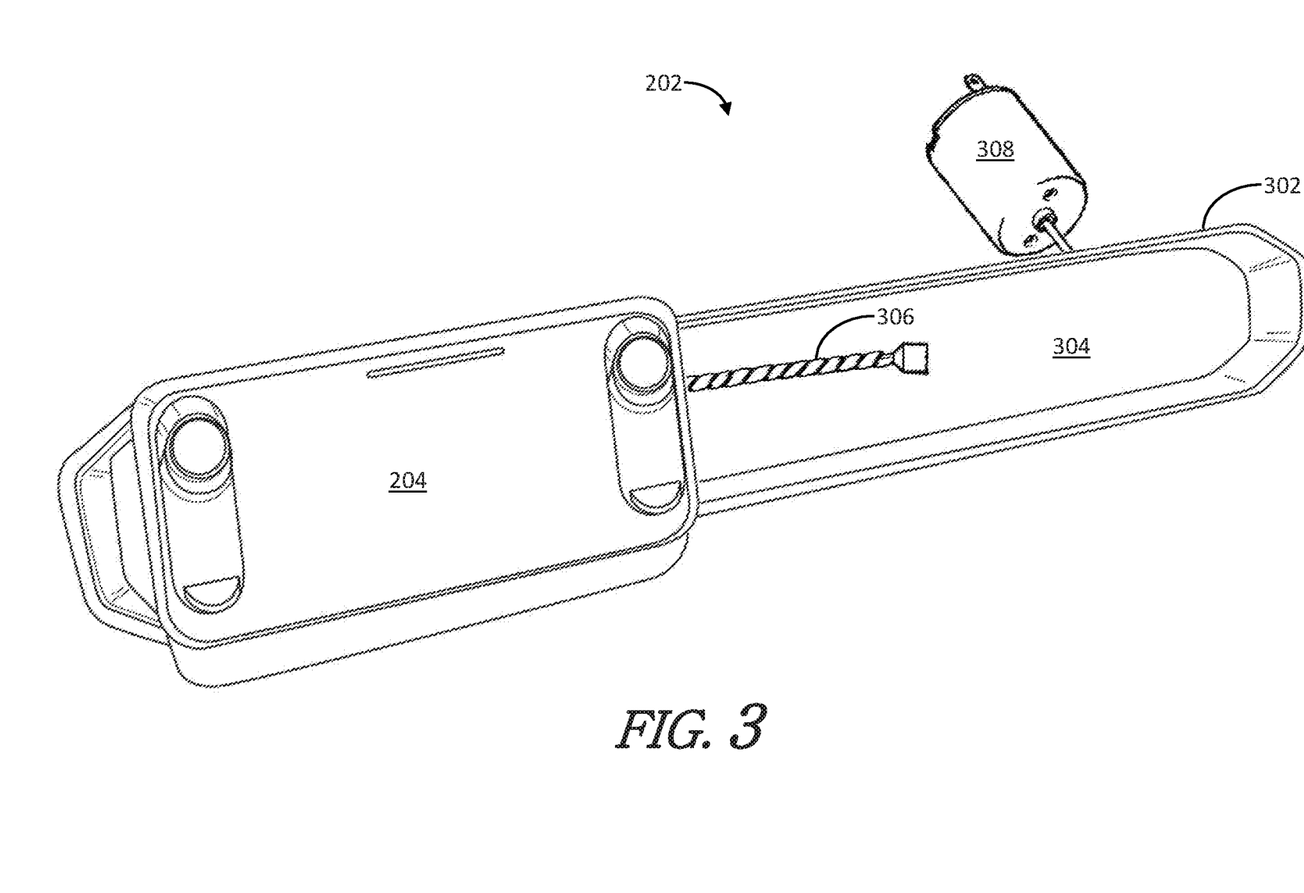
FIG. 3 depicts an example design of aspects of an apparatus for positioning an interactive-display device within an interior of an autonomous vehicle according to example embodiments of the present disclosure.

FIG. 3 depicts an example design of aspects of an apparatus for positioning an interactive-display device within an interior of an autonomous vehicle according to example embodiments of the present disclosure.

Referring to FIG. 3, in some embodiments, apparatus 202 can include track 302 along which interactive-display device 204 can be configured to travel amongst the different predetermined positions (e.g., positions 206, 208, and/or the like). For example, track 302 can include multiple different discrete positions that are distinct from one another and include the different predetermined positions (e.g., positions 206, 208, and/or the like). Additionally or alternatively, track 302 can provide continuous resistance to the travel by interactive-display device 204 amongst the different predetermined positions (e.g., positions 206, 208, and/or the like) such that interactive-display device 204 can be positioned in a stationary manner between one or more of the different predetermined positions (e.g., positions 206, 208, and/or the like).

In some embodiments, a geometry of track 302 can define (e.g., via a perimeter of the shape of track 302, and/or the like) at least in part cavity 304 in the at least a portion of interior 200 to which apparatus 202 is affixed. In some of such embodiments, cavity 304 can accommodate one or more wires and/or cables 306 that interface interactive-display device 204 with autonomous vehicle 10 (e.g., to mitigate exposure of wire(s) and/or cable(s) 306 to the passenger(s), and/or the like).

In some embodiments, apparatus 202 can include motor 308 configured to move interactive-display device 204 amongst the different predetermined positions (e.g., positions 206, 208, and/or the like). In some of such embodiments, apparatus 202 can be configured to utilize motor 308 to move interactive-display device 204 to a position (e.g., of the different predetermined positions, and/or the like) associated with a portion of interior 200 in which one or more sensors of autonomous vehicle 10 have detected presence of a passenger (e.g., in response to the sensor(s) detecting such presence, and/or the like). For example, apparatus 202 can be configured to utilize motor 308 to move interactive-display device 204 to position 208 in response to sensor(s) 218 detecting presence of a passenger in portion 212. Additionally or alternatively, apparatus 202 can be configured to utilize motor 308 to move interactive-display device 204 to a default position (e.g., located between positions 206 and 208, and/or the like), for example, in response to a determination (e.g., based at least in part on data generated by the sensor(s), and/or the like) that the different portions of interior 200 are unoccupied by the passenger(s).

Figure 4A:
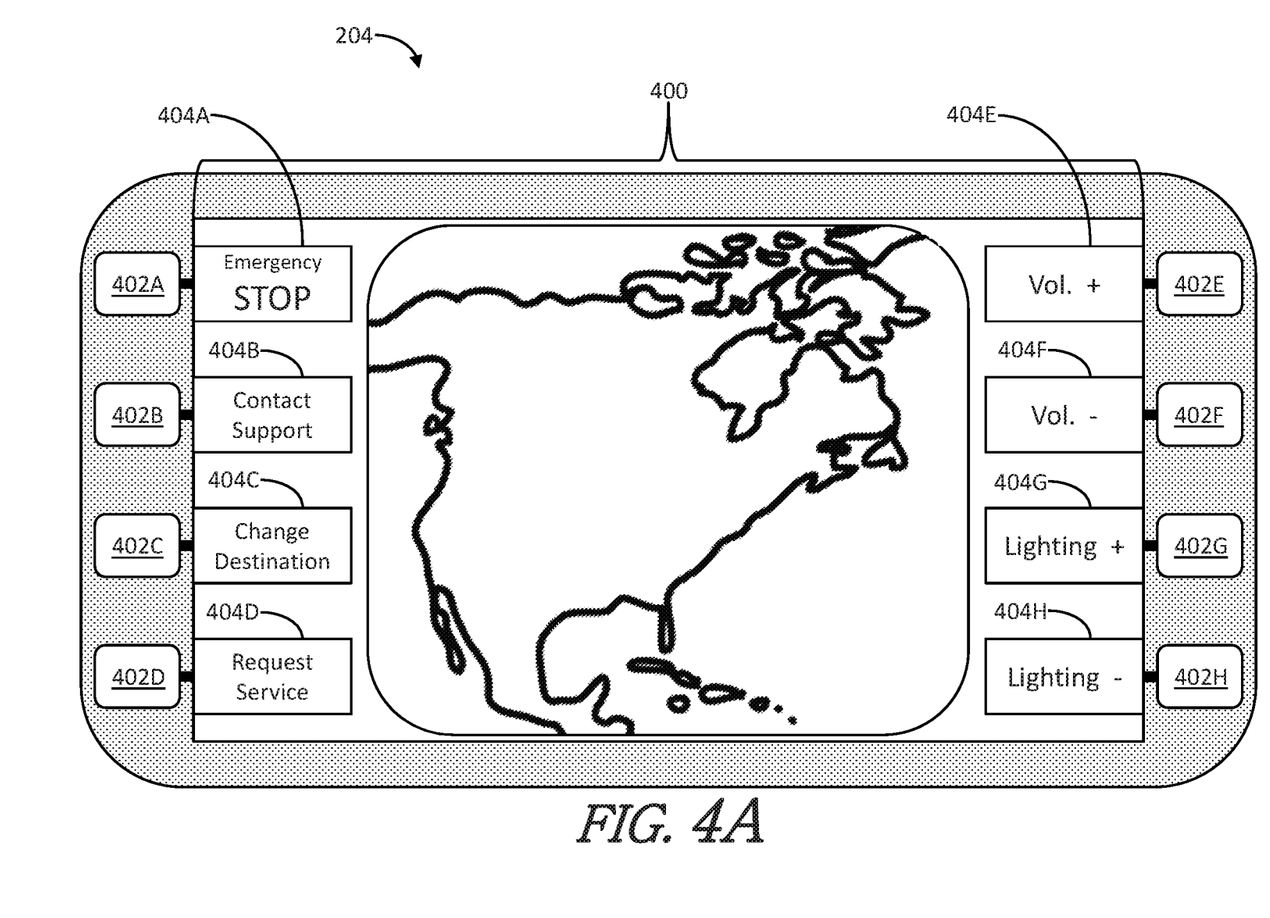
FIGS. 4A and 4B depict example interactive-display devices displaying example graphical interfaces according to example embodiments of the present disclosure.
Figure 4B:
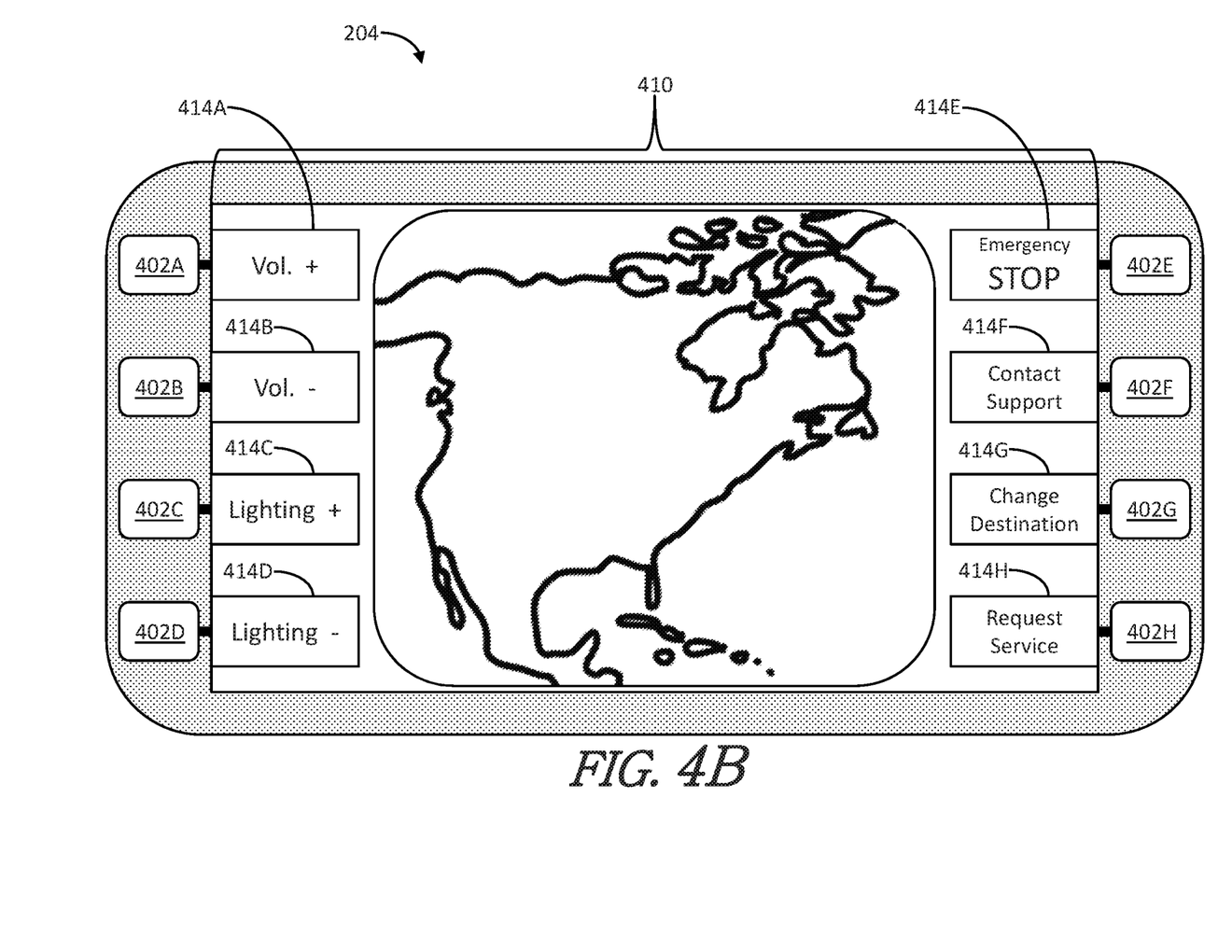

FIGS. 4A and 4B depict example interactive-display devices displaying example graphical interfaces according to example embodiments of the present disclosure.

Computing system 102 can be configured to generate data describing one or more graphical interfaces for display by interactive-display device 204 and to communicate such data to interactive-display device 204. For example, referring to FIGS. 4A and 4B, computing system 102 can be configured to generate data describing one or more of graphical interfaces 400 and/or 410 for display by interactive-display device 204 and to communicate such data to interactive-display device 204.

In some embodiments, apparatus 202 can generate data indicating a position of interactive-display device 204 within interior 200 (e.g., a particular position of the predetermined positions, and/or the like), and computing system 102 can receive such data. In some of such embodiments, computing system 102 can generate the data describing the graphical interface(s) based at least in part on the data indicating the position of interactive-display device 204. For example, apparatus 202 can generate data indicating interactive-display device 204 is located in position 206, and computing system 102 can receive such data and can generate interface 400 based at least in part on such data. Similarly, apparatus 202 can generate data indicating interactive-display device 204 is located in position 208, and computing system 102 can receive such data and can generate interface 410 based at least in part on such data.

In some embodiments, the graphical interface(s) can include one or more elements positioned within the graphical interface(s) to be accessible by a passenger located in a portion of interior 200 associated with the position of interactive-display device 204 indicated by the data received from apparatus 202. For example, interface 400 can include one or more of elements 404A, 404B, 404C, 404D, 404E, 404F, 404G, and/or 404H, which can be positioned within interface 400 such that they are accessible by a passenger located in portion 210. Similarly, interface 410 can include one or more of elements 414A, 414B, 414C, 414D, 414E, 414F, 414G, and/or 414H, which can be positioned within interface 410 such that they are accessible by a passenger located in portion 212.

In some embodiments, interactive-display device 204 can include a touchscreen. In some of such embodiments, the element(s) of the graphical interface(s) can correspond to one or more functions of autonomous vehicle 10 for invocation (e.g., via the touchscreen, and/or the like) by the passenger located in the portion of interior 200 associated with the position of interactive-display device 204. For example, elements 404A, 404B, 404C, 404D, 404E, 404F, 404G, and/or 404H can correspond to one or more functions of autonomous vehicle 10 for invocation by the passenger located in portion 210. Similarly, elements 414A, 414B, 414C, 414D, 414E, 414F, 414G, and/or 414H can correspond to one or more functions of autonomous vehicle 10 for invocation by the passenger located in portion 212.

In some embodiments, such function(s) can include one or more functions, for example, one or more high-priority functions, safety-related functions, frequently accessed functions, and/or the like (e.g., emergency stop, contact support, change destination, request service, and/or the like) for which accessibility by the passenger has been determined to be important, for example, relative to one or more other functions of autonomous vehicle 10 (e.g., increase audio volume, decrease audio volume, brighten interior lighting, dim interior lighting, and/or the like). One or more interface elements corresponding to such high-priority function(s) can be positioned within the interface(s) such that they are more readily accessible by (e.g., proximate to, and/or the like) the passenger located in the portion of interior 200 associated with the position of interactive-display device 204 relative to one or more interface elements corresponding to the other (e.g., lower-priority, and/or the like) function(s). For example, elements 404A, 404B, 404C, and/or 404D can be positioned within interface 400 such that they are more readily accessible by the passenger located in portion 210 than elements 404E, 404F, 404G, and/or 404H. Similarly, elements 414E, 414F, 414G, and/or 414H can be positioned within interface 410 such that they are more readily accessible by the passenger located in portion 212 than elements 414A, 414B, 414C, and/or 414D.

In some embodiments, interactive-display device 204 can include one or more configurable controls. For example, interactive-display device 204 can include one or more of configurable controls 402A, 402B, 402C, 402D, 402E, 402F, 402G, and/or 402H. In some of such embodiments, the element(s) of the graphical interface(s) can include one or more labels for the configurable control(s). For example, in interface 400, element 404A can label control 402A, element 404B can label control 402B, element 404C can label control 402C, element 404D can label control 402D, element 404E can label control 402E, element 404F can label control 402F, element 404G can label control 402G, and/or element 404H can label control 402H. Similarly, in interface 410, element 414A can label control 402A, element 414B can label control 402B, element 414C can label control 402C, element 414D can label control 402D, element 414E can label control 402E, element 414F can label control 402F, element 414G can label control 402G, and/or element 414H can label control 402H.

Such label(s) can identify one or more functions of autonomous vehicle 10, and computing system 102 can configure the configurable control(s) to correspond to the function(s) of autonomous vehicle 10. For example, in response to determining that interactive-display device 204 is located in position 206, computing system 102 can configure control 402A to correspond to a function identified by element 404A, control 402B to correspond to a function identified by element 404B, control 402C to correspond to a function identified by element 404C, control 402D to correspond to a function identified by element 404D, control 402E to correspond to a function identified by element 404E, control 402F to correspond to a function identified by element 404F, control 402G to correspond to a function identified by element 404G, and/or control 402H to correspond to a function identified by element 404H. Similarly, in response to determining that interactive-display device 204 is located in position 208, computing system 102 can configure control 402A to correspond to a function identified by element 414A, control 402B to correspond to a function identified by element 414B, control 402C to correspond to a function identified by element 414C, control 402D to correspond to a function identified by element 414D, control 402E to correspond to a function identified by element 414E, control 402F to correspond to a function identified by element 414F, control 402G to correspond to a function identified by element 414G, and/or control 402H to correspond to a function identified by element 414H.

In some embodiments, such function(s) can include one or more functions for which accessibility by the passenger has been determined to be important, and computing system 102 can configure one or more of the configurable control(s) more readily accessible by the passenger located in the portion of interior 200 associated with the position of interactive-display device 204 to correspond to such important function(s).

Figure 5:
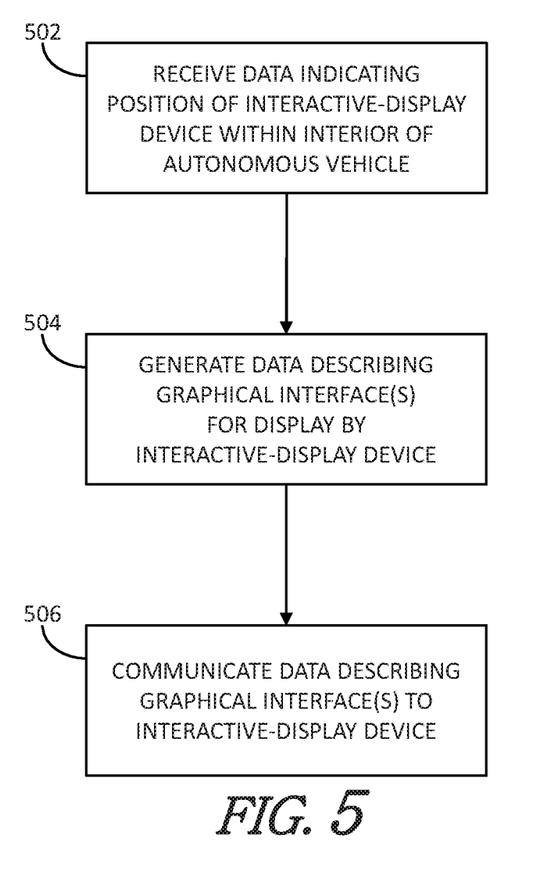
FIG. 5 depicts an example method according to example embodiments of the present disclosure.

FIG. 5 depicts an example method according to example embodiments of the present disclosure.

Referring to FIG. 5, at (502), a computing system can receive data indicating a position of an interactive-display device within an interior of an autonomous vehicle. Such data can indicate the interactive-display device is positioned in a particular position within the interior associated with a particular portion on the interior configured to accommodate one or more passengers of the autonomous vehicle. For example, computing system 102 can receive, from apparatus 202, data indicating interactive-display device 204 is positioned in position 206.

At (504), the computing system can generate, based at least in part on the data indicating the position, data describing one or more graphical interfaces for display by the interactive-display device. The graphical interface(s) can include one or more elements positioned within the graphical interface(s) to be accessible by a passenger located in the particular portion of the interior. For example, computing system 102 can generate, based on the data indicating interactive-display device 204 is positioned in position 206, data describing interface 400.

At (506), the computing system can communicate the data describing the graphical interface(s) to the interactive-display device. For example, computing system 102 can communicate the data describing interface 400 to interactive-display device 204.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. An autonomous vehicle comprising:
an interior comprising at least two different interior portions configured to accommodate one or more passengers;
an interactive-display device; and
an apparatus for positioning the interactive-display device within the interior such that it is accessible by at least one of the one or more passengers, wherein:
the interactive-display device is affixed to at least a portion of the apparatus;
the apparatus is affixed to at least a portion of the interior;
the apparatus is configured to position the interactive-display device in at least two different predetermined positions associated with the at least two different interior portions configured to accommodate the one or more passengers;
the apparatus comprises a motor configured to move the interactive-display device amongst the at least two different predetermined positions; and
the apparatus is configured to, responsive to a determination that the at least two different interior portions are unoccupied by the one or more passengers, utilize the motor to move the interactive-display device to a default position located between the two different predetermined positions.

2. The autonomous vehicle of claim 1, wherein:
the at least two different interior portions comprise a first portion and a second portion;
the first portion being configured such that a passenger occupying the first portion faces forward within the interior;
the second portion being configured such that a passenger occupying the second portion faces rearward within the interior;
a first position of the at least two different predetermined positions locates the interactive-display device within the interior such that it is accessible by the passenger occupying the first portion; and
a second position of the at least two different predetermined positions locates the interactive-display device within the interior such that it is accessible by the passenger occupying the second portion.

3. The autonomous vehicle of claim 1, wherein the apparatus comprises a track along which the interactive-display device is configured to travel amongst the at least two different predetermined positions.

4. The autonomous vehicle of claim 3, wherein the track comprises a plurality of different discrete positions that are distinct from one another and include the at least two different predetermined positions.

5. The autonomous vehicle of claim 3, wherein the track provides continuous resistance to the travel by the interactive-display device amongst the at least two different predetermined positions such that the interactive-display device can be positioned in a stationary manner between the at least two different predetermined positions.

6. The autonomous vehicle of claim 3, wherein a geometry of the track defines at least in part a cavity in the at least a portion of the interior to which the apparatus is affixed.

7. The autonomous vehicle of claim 6, wherein the cavity accommodates one or more wires or cables that interface the interactive-display device with the autonomous vehicle.

8. The autonomous vehicle of claim 1, wherein:
the autonomous vehicle comprises one or more sensors configured to detect presence of a passenger in a particular portion of the at least two different interior portions; and
the apparatus is configured to, responsive to the one or more sensors detecting the presence of the passenger in the particular portion, utilize the motor to move the interactive-display device to a position of the at least two different predetermined positions associated with the particular portion of the interior.

9. The autonomous vehicle of claim 1, wherein the at least a portion of the interior to which the apparatus is affixed comprises at least a portion of a door of the autonomous vehicle.

10. The autonomous vehicle of claim 9, wherein:
the door comprises a portion that opens toward a top of the autonomous vehicle and away from a different portion of the door that opens toward a bottom of the autonomous vehicle; and
the at least a portion of the interior to which the apparatus is affixed comprises at least a portion of the portion of the door that opens towards the top of the autonomous vehicle.

11. The autonomous vehicle of claim 1, comprising a computing system comprising:
one or more processors; and
a memory storing instructions that when executed by the one or more processors cause the computing system to perform operations comprising:
receiving data indicating the interactive-display device is positioned in a particular position of the at least two different predetermined positions;
generating, based at least in part on the data indicating the interactive-display device is positioned in the particular position, data describing one or more graphical interfaces for display by the interactive-display device, the one or more graphical interfaces comprising one or more elements positioned within the one or more graphical interfaces to be accessible by a passenger located in a portion of the at least two different interior portions associated with the particular position; and
communicating, to the interactive-display device, the data describing the one or more graphical interfaces for display by the interactive-display device.

12. The autonomous vehicle of claim 11, wherein:
the interactive-display device comprises a touchscreen; and
the one or more elements correspond to one or more functions of the autonomous vehicle for invocation by the passenger located in the portion via the touchscreen.

13. The autonomous vehicle of claim 11, wherein:
the interactive-display device comprises one or more configurable controls;
the one or more elements comprise one or more labels for the one or more configurable controls;
the one or more labels identify one or more functions of the autonomous vehicle; and
the operations comprise configuring the one or more configurable controls to correspond to the one or more functions.

14. An apparatus for positioning an interactive-display device within an interior of an autonomous vehicle, the apparatus comprising:
  a portion for affixing an interactive-display device to at least a portion of the apparatus;
  a portion for affixing the apparatus to at least a portion of an interior, of an autonomous vehicle, comprising at least two different interior portions configured to accommodate one or more passengers; and
  a mechanism for moving the interactive-display device between at least two different predetermined positions associated with the at least two different interior portions configured to accommodate the one or more passengers, wherein:
    the mechanism comprises a motor configured to move the interactive-display device amongst the at least two different predetermined positions; and
    the mechanism is configured to, responsive to a determination that the at least two different interior portions are unoccupied by the one or more passengers, utilize the motor to move the interactive-display device to a default position located between the two different predetermined positions.

15. The apparatus of claim 14, wherein:
  the at least two different interior portions comprise a first portion and a second portion;
  the first portion being configured such that a passenger occupying the first portion faces forward within the interior;
  the second portion being configured such that a passenger occupying the second portion faces rearward within the interior;
  a first position of the at least two different predetermined positions locates the interactive-display device within the interior such that it is accessible by the passenger occupying the first portion; and
  a second position of the at least two different predetermined positions locates the interactive-display device within the interior such that it is accessible by the passenger occupying the second portion.

16. The apparatus of claim 14, wherein the mechanism comprises a track along which the interactive-display device is configured to travel between the at least two different predetermined positions.

17. A system comprising:
  one or more processors
  an interactive-display device;
  a mechanism for moving the interactive-display device between at least two different predetermined positions associated with at least two different interior portions of an interior of an autonomous vehicle configured to accommodate one or more passengers, wherein:
    the mechanism comprises a motor configured to move the interactive-display device amongst the at least two different predetermined positions; and
    the mechanism is configured to, responsive to a determination that the at least two different interior portions are unoccupied by the one or more passengers, utilize the motor to move the interactive-display device to a default position located between the two different predetermined positions; and
  a memory storing instructions that when executed by the one or more processors cause the system to perform operations comprising:
  receiving data indicating a position of the interactive-display device within the interior of the autonomous vehicle, the data indicating the interactive-display device is positioned in a particular position of the at least two different predetermined positions of the interactive-display device within the interior, the particular position being associated with a particular portion of the at least two different interior portions;
  generating, based at least in part on the data indicating the position, data describing one or more graphical interfaces for display by the interactive-display device, the one or more graphical interfaces comprising one or more elements positioned within the one or more graphical interfaces to be accessible by a passenger located in the particular portion of the interior of the autonomous vehicle; and
  communicating, to the interactive-display device, the data describing the one or more graphical interfaces for display by the interactive-display device.

18. The system of claim 17, wherein:
  the interactive-display device comprises a touchscreen; and
  the one or more elements correspond to one or more functions of the autonomous vehicle for invocation by the passenger located in the particular portion via the touchscreen.

* * * * *